United States Patent
Hwang et al.

(10) Patent No.: US 9,904,524 B2
(45) Date of Patent: Feb. 27, 2018

(54) METHOD AND DEVICE FOR VISUALLY IMPLEMENTING SOFTWARE CODE

(71) Applicants: Soo-Jin Hwang, Changwon-si (KR); In-Suk Choi, Changwon-si (KR)

(72) Inventors: Soo-Jin Hwang, Changwon-si (KR); In-Suk Choi, Changwon-si (KR)

(*) Notice: Subject to any disclaimer, the term of this patent is extended or adjusted under 35 U.S.C. 154(b) by 0 days.

(21) Appl. No.: 15/102,259

(22) PCT Filed: May 8, 2015

(86) PCT No.: PCT/KR2015/004651
§ 371 (c)(1),
(2) Date: Jun. 6, 2016

(87) PCT Pub. No.: WO2015/178605
PCT Pub. Date: Nov. 26, 2015

(65) Prior Publication Data
US 2017/0168784 A1    Jun. 15, 2017

(30) Foreign Application Priority Data
May 22, 2014 (KR) .................. 10-2014-0061828

(51) Int. Cl.
*G06F 9/44* (2006.01)
*G06F 3/048* (2013.01)
(Continued)

(52) U.S. Cl.
CPC ............ *G06F 8/34* (2013.01); *G06F 9/44589* (2013.01)

(58) Field of Classification Search
CPC .......... G05B 19/0426; G05B 19/41845; G05B 2219/25428; G05B 2219/23258; G05B 15/02; G06F 8/34; G06F 9/44589
See application file for complete search history.

(56) References Cited

U.S. PATENT DOCUMENTS 7,853,937 B2 * 12/2010 Janczewski ............. G06F 8/314
 712/203
8,806,348 B2 * 8/2014 Quine ............... G06F 17/30294
 715/744
(Continued)

FOREIGN PATENT DOCUMENTS

EP    1 186 997 A2    3/2002
JP    2007-11507 A    1/2007
(Continued)

OTHER PUBLICATIONS

Fors et al., Implementing semantic feedback in a diagram editor, Jul. 2013, 9 pages.*
(Continued)

*Primary Examiner* — Thuy Dao
(74) *Attorney, Agent, or Firm* — John P. White; Cooper & Dunham LLP

(57) ABSTRACT

The present invention relates to a method and device for visually implementing a software code. To this end, a method for visually implementing a software code according to the present invention comprises the steps of: generating, by a code block generation unit, a code block used for implementing a software code by the unit of block depending on a requirement and a function; and setting, by a code block setting unit, a code block attribute or an internal attribute code included in the code block on the basis of information input from a user, wherein the step of setting the code block attribute or the internal attribute code comprises the step of including function information on the code block, description information on the function information, and the internal attribute code in the code block.

15 Claims, 21 Drawing Sheets

(51) Int. Cl.
*G06F 9/45* (2006.01)
*G06F 9/445* (2018.01)

(56) References Cited

U.S. PATENT DOCUMENTS

| | | | |
|---|---|---|---|
| 9,170,783 B1* | 10/2015 | Orofino, II | G06F 8/33 |
| 9,618,925 B2* | 4/2017 | Eldridge | G05B 19/056 |
| 2003/0188231 A1* | 10/2003 | Cronce | G06F 21/54 |
| | | | 714/52 |
| 2006/0101416 A1* | 5/2006 | Callahan, II | G06F 11/3404 |
| | | | 717/128 |
| 2006/0200811 A1* | 9/2006 | Cheng | G06F 8/41 |
| | | | 717/144 |
| 2008/0127127 A1* | 5/2008 | Chitgupakar | G06F 8/51 |
| | | | 717/137 |
| 2008/0195483 A1* | 8/2008 | Moore | G06F 17/3089 |
| | | | 705/14.69 |
| 2013/0283233 A1* | 10/2013 | Castellanos | G06F 8/30 |
| | | | 717/113 |
| 2014/0325184 A1* | 10/2014 | Rotem | G06F 9/30083 |
| | | | 712/42 |
| 2016/0291942 A1* | 10/2016 | Hutchison | G06F 8/34 |

FOREIGN PATENT DOCUMENTS

| | | |
|---|---|---|
| JP | 2010-140326 A | 6/2010 |
| JP | 2013-210865 A | 10/2013 |
| JP | 2014-78264 A | 5/2014 |
| KR | 10-2007-0061326 A | 6/2007 |
| KR | 2012-0130420 A | 12/2012 |
| KR | 10-2013-0065706 A | 11/2015 |
| KR | 2015-0041399 A | 4/2016 |

OTHER PUBLICATIONS

Z. Gu, Capturing and exploiting fine-grained IDE interactions, Jun. 2012, 2 pages.*

* cited by examiner

```
{
// DECLARE LOCAL VARIABLES OF CODE BLOCK//
    int a ;

// ALLOCATE INPUT VARIABLES OF UPPER CODE BLOCK//
    a = input ;

// PERFORM OPERATION OF CODE BLOCK ITSELF//                    B1
    printf("Helllo, World! \ n") ;

// RETURN RESULT TO UPPER CODE BLOCK
    result = a+1 ;
}
```

FIG. 10

```
{
    // DECLARE LOCAL VARIABLES OF CODE BLOCK//
    int a ;

// ALLOCATE INPUT VARIABLES OF UPPER CODE BLOCK//
    a = input ;

for (CONDITION)
    {
        // PERFORM OPERATION OF CODE BLOCK ITSELF//
        printf("Helllo, World!\n") ;
    }

// RETURN RESULT TO UPPER CODE BLOCK
    result = a+1 ;
}
```

FIG. 11

```
{
  // DECLARE LOCAL VARIABLES OF CODE BLOCK//
  int a ;

// ALLOCATE INPUT VARIABLES OF UPPER CODE BLOCK//
  a = input ;

while (CONDITION)
  {
    // PERFORM OPERATION OF CODE BLOCK ITSELF//
    printf("Helllo, World! \ n") ;
  }                                                          ~B3

// RETURN RESULT TO UPPER CODE BLOCK
  result = a+1 ;
}
```

FIG. 12

```
{
// DECLARE LOCAL VARIABLES OF CODE BLOCK//
int a ;

// ALLOCATE INPUT VARIABLES OF UPPER CODE BLOCK//
a = input ;

Do
{
// PERFORM OPERATION OF CODE BLOCK ITSELF//
printf("Helllo, World! \ n") ;
} while (CONDITION)

// RETURN RESULT TO UPPER CODE BLOCK
result = a+1 ;
}
```

```
{
// DECLARE LOCAL VARIABLES OF CODE BLOCK//
int a ;

// ALLOCATE INPUT VARIABLES OF UPPER CODE BLOCK//
a = input ;

Switch(NUMBER)
{
   case 1 :
   {
// case PERFORM OPERATION OF CODE BLOCK ITSELF//
     printf("Helllo, World! \ n") ;
   }
     break ;
   }
  default ;
   {
// case PERFORM OPERATION OF CODE BLOCK ITSELF//
    printf("Hello, Today! \ n") ;
    break
   }
}

// RETURN RESULT TO UPPER CODE BLOCK
  result = a+1 ;
}
```

```
{
  // DECLARE LOCAL VARIABLES OF CODE BLOCK//
  int a ;

// ALLOCATE INPUT VARIABLES OF UPPER CODE BLOCK//
  a = input ;

If(CONDITION)
  {
   // If PERFORM OPERATION OF CODE BLOCK ITSELF//
     printf("Helllo, World! \ n") ;
   }
     else ;
   {
    // else PERFORM OPERATION OF CODE BLOCK ITSELF//
     printf("Hello, Today! \ n") ;
   }

// RETURN RESULT TO UPPER CODE BLOCK
  result = a+1 ;
}
```
— B6

FIG. 15

```
// DECLARE FUNCTION NAME (PARAMETER)
 Function(input)

// DEFINE FUNCTION CONTENTS
 Function(input)
 {
   // DECLARE LOCAL VARIABLES OF FUNCTION CODE BLOCK//
     int a ;

// ALLOCATE INPUT VARIABLES OF UPPER CODE BLOCK//
   a = input ;

// PERFORM OPERATION OF FUNCTION CODE BLOCK ITSELF//
    printf("Helllo, World! \ n") ;
    result = a+1 ;

// RETURN RESULT
   return result ;
 }
```

FIG. 16

```
// DEFINED FUNCTION CODE BLOCK//

Function(INPUT VARIABLE)
{
   // DECLARE LOCAL VARIABLES OF FUNCTION CODE BLOCK//
      int a ;

// ALLOCATE INPUT VARIABLES OF UPPER CODE BLOCK//
   a = input ;

// PERFORM OPERATION OF FUNCTION CODE BLOCK ITSELF//
   printf("Helllo, World! \ n") ;
   result = a+1 ;

// ALLOCATE OUTPUT VARIABLES TO BE RETURNED//
   result = a+1 ;

// RETURN RESULT
   return result ;
}
```

FIG. 17

METHOD AND DEVICE FOR VISUALLY IMPLEMENTING SOFTWARE CODE

CROSS-REFERENCE TO RELATED APPLICATIONS

This application is a § 371 national stage of PCT International Application No. PCT/KR2015/004651, filed May 8, 2015, claiming priority of Korean Patent Application No. KR 10-2014-0061828, filed May 22, 2014, the content of each of which is hereby incorporated by reference into the application.

TECHNICAL FIELD

The present invention generally relates to a method and device for visually implementing software code and, more particularly, to a method and device for visually implementing software code using code blocks.

BACKGROUND ART

Generally, the development of software is performed via a series of procedures ranging from the derivation of requirements of engineers to the design of functions, the implementation of code, and the verification of software. During these procedures, a large number of difficulties are present, but tools for obviously arranging requirements, tools for modeling functions, tools for supporting the programming of code, etc. have been developed and have provided lots of help to software developers.

However, in order for engineers to implement software based on derived requirements, a detailed function of meeting the requirements must be designed and the functions thereof must be implemented as code, but there is no tool for directly supporting a method for implementing the detailed function as code. In other words, there is no tool for causing the functionality of software to correspond to code in a one-to-one manner and obviously checking and implementing code in relation to the location of software code where requirements and functional designs are implemented, how they are implemented, and which relationships with other functions exist.

Functions represented in a typical language, drawing or diagram are understood by a human being and must be represented in other forms such as code. That is, such representation must be converted from a normal language into a programming language via a medium such as a human. Due thereto, even if a function is desirably designed, it may not match the implemented code thereof, or the corresponding function may be erroneously implemented, with the result that many errors may be detected in software. Further, although not expressed outwardly, if code is modified in a way different from which the code was intended to be implemented, there is the strong latent possibility that errors will occur.

In the case of software for which a long period of time has elapsed since the implementation thereof, even if defined requirements and design data are present, there may occur a phenomenon in which the structure of the software code thereof cannot be easily understood. That is, due to the difference in representation between the normal language required to represent the functionality of software and the code used to implement software, software code may include therein several unintended elements, depending not only on personal tendency and intention of the person who implements the software code and a scheme for solving the problem, but also on a method for understanding requirements and a method for reinterpreting the design of software. Due to this point, those elements become a great impediment to the universal understanding and interpretation of code, and the readability of software code is deteriorated, thus preventing the efficient development of software.

It is more difficult to read and understand a programming language than a typical language. In a programming language, code must be sequentially configured depending on the flow of control, and must be precisely declared and defined for each representation. That is, unless components in a programming language are sequentially represented according to the sequence, the representation has a different meaning. Unless the forms or meanings of data used in such a programming language and syntax such as command statements are precisely defined, errors may occur. The reason for this is that it is impossible for a computer to determine or understand data in consideration of context, and thus statements in all programming languages must be clearly defined and sequenced to constitute a single meaning. Due thereto, normal source code is configured in the form of text, and a semantic unit of code is represented by a single line, and thus code is configured depending on the sequence of lines.

A programming language does not precisely represent diagrams or drawings that were used to help the understanding of a human being or philosophical or abstract functions when functions are defined. In addition, since the semantic units of code are lines, it is not easy to understand the degree of detailed implementation of software in the case of a large amount of code until the meaning of the code is interpreted by individually and directly inspecting the lines thereof. Of course, it is possible to investigate the approximate meanings of the code using a design document. However, as described above, since a difference in representation is present between the design document and actual code (difference in representation between a normal language and a programming language), a problem arises in that a method in which code constituting actual software is implemented cannot be checked merely by viewing the design document.

DISCLOSURE

Technical Problem

An object of the present invention is to implement software in the form of complete components including code blocks.

Another object of the present invention is to provide a device and method for visually implementing software code used in a programming language when requirements and functions derived to develop software are implemented in code.

Technical Solution

A method for visually implementing software code according to the present invention to accomplish the above objects includes generating, by a code block generation unit, code blocks used to implement software code on a per-block basis depending on the requirements and the functions; and setting, by a code block setting unit, a code block attribute or internal attribute code that is included in each of the code blocks, based on information input from a user, wherein setting the code block attribute or the internal attribute code comprises including function information about the code block, description information about the function information, and the internal attribute code in the code block.

The method for visually implementing software code according to the present invention may further include converting, by a code block conversion unit, the code block into code corresponding to a preset programming language when a request is received from the user.

The method for visually implementing software code according to the present invention may further include, after setting the code block attribute or the internal attribute code, when a request to display the code block is received from the user, displaying function information, description information, and internal attribute code pertaining to the code block on a display unit.

Further, setting the code block attribute or the internal attribute code may include including a location, a block number, an index, a management number, and the internal attribute code of the code block in the code block.

Furthermore, setting the code block attribute or the internal attribute code may include when multiple code blocks are generated by the code block generation unit, classifying the multiple code blocks in a layered tree structure or a layered block structure depending on settings of the user.

Furthermore, setting the code block attribute or the internal attribute code may include automatically allocating block numbers depending on locations of the code blocks in the layered tree structure or layered block structure.

Furthermore, the block numbers allocated at the allocating the block numbers may be automatically changed when locations of the code blocks are changed via input of the user.

The code blocks may be classified into an upper code block and a lower code block depending on locations in a layered tree structure or layered block structure, and may be configured such that internal attribute code included in the lower code block is implemented independent of the upper code block, and such that input/output parameters of the lower code block included in the upper code block are capable of being combined and indexed based on characteristics.

Furthermore, the upper code block may include one or more lower code blocks, and one or more lower code blocks may receive an input parameter from the upper code block, and may return an output parameter to the upper code block.

Furthermore, when the code blocks are composed of multiple layers, an upper code block may include all input/output parameters required by lower code blocks just subordinate to the upper code block.

Furthermore, the code blocks may include a declarative statement code block, a loop statement code block, and a conditional statement code block depending on control flow.

Furthermore, setting the code block attribute or the internal attribute code that is included in each of the code blocks may include setting a relationship between previously generated code blocks and the code blocks to an inclusion relationship or a parallel relationship.

Furthermore, at setting the code block attribute or the internal attribute code, the internal attribute code may be input from the user via a coding window including at least one of a variable declaration window used to declare an input variable and an output variable of the internal attribute code; an input variable allocation window used to allocate the input variable; a conditional statement window used to input a conditional statement or a loop statement; a code input window used to input software code required to implement a function of the corresponding code block; and an output variable allocation window used to allocate the output variable.

Furthermore, the method for visually implementing software code according to the present invention may further include, after setting the code block attribute or the internal attribute code, verifying, by a code block verification unit, the code blocks either using a random variable or using variables that are input to or output from a conditional statement in each code block.

Furthermore, the method for visually implementing software code according to the present invention may further include, after setting the code block attribute or the internal attribute code, setting, by a code block permission setting unit, permission to access the code blocks.

A device for visually implementing software code according to the present invention to accomplish the above objects includes a code block generation unit for generating code blocks used to implement software code on a per-block basis depending on the requirements and the functions; and a code block setting unit for setting a code block attribute or internal attribute code that is included in each of the code blocks, based on information input from a user, wherein the code block setting unit includes function information about the code block, description information about the function information, and the internal attribute code in the code block.

Advantageous Effects

In accordance with the method and device for visually implementing software code according to the present invention, there is an advantage in that visual software coding is possible using code blocks divided into respective functional units, and a higher-dimensional representation using code blocks becomes possible, rather than existing coding represented by individual lines, thus enabling the development of software by a user or an operator to be more efficiently performed.

Further, in accordance with the method and device for visually implementing software code according to the present invention, there is an advantage in that the relationship between code blocks is clarified, and the flow of input/output parameters is also clarified, thus improving the readability of code and facilitating the reuse of software.

Furthermore, in accordance with the method and device for visually implementing software code according to the present invention, there is an advantage in that the code of software is configured such that the function performance units of the code correspond to code blocks in a one-to-one manner, and such code blocks may be implemented in a tree structure or a layered block structure, thereby allowing the user to more intuitively implement software code.

DESCRIPTION OF DRAWINGS

FIGS. 10 to 17 are diagrams showing the types of code blocks stored in a storage unit according to an embodiment of the present invention;

BEST MODE

Figure 1:
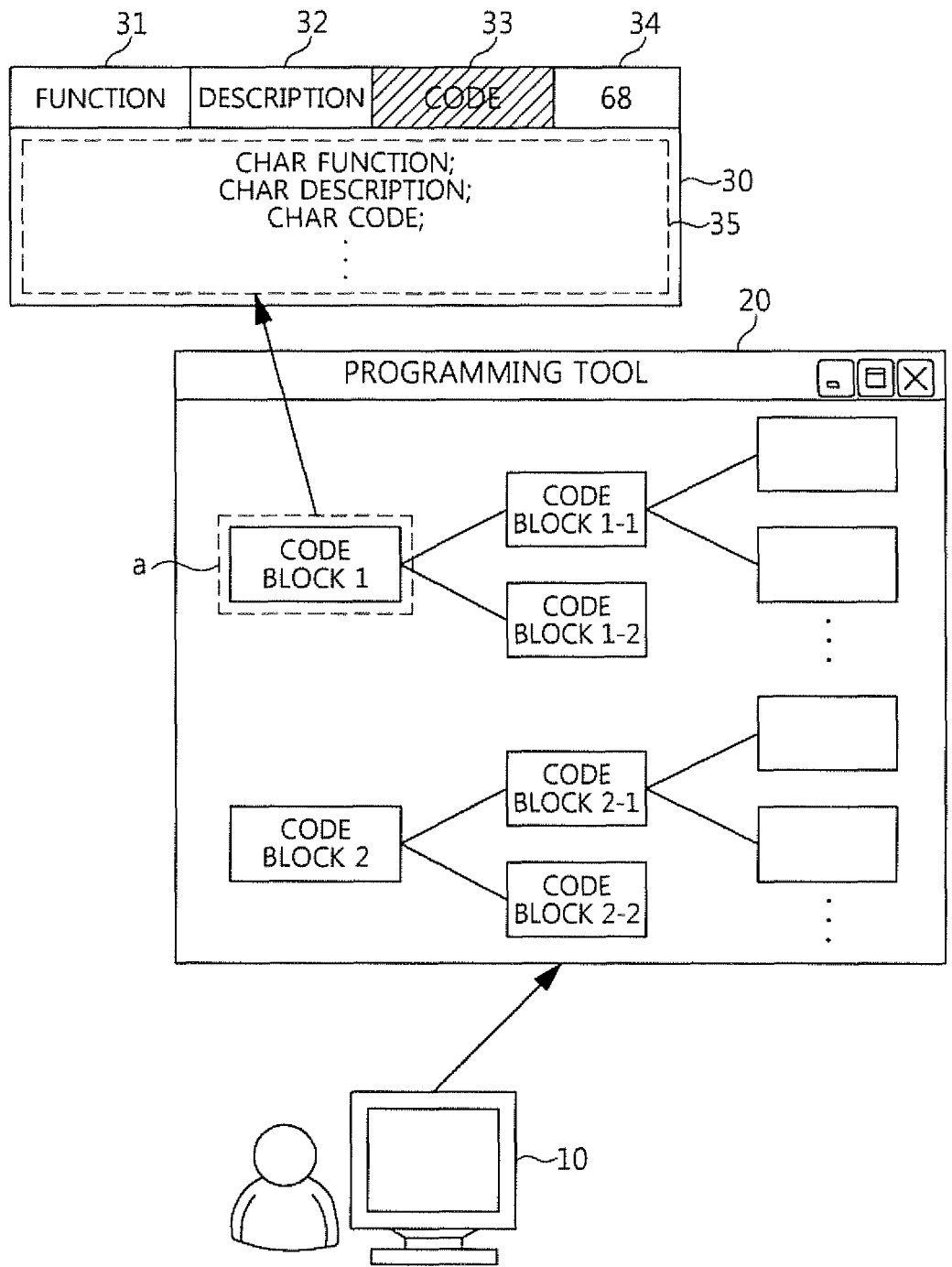
FIG. 1 is a conceptual diagram showing a method for implementing software code using a device for visually implementing software code according to the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 2:
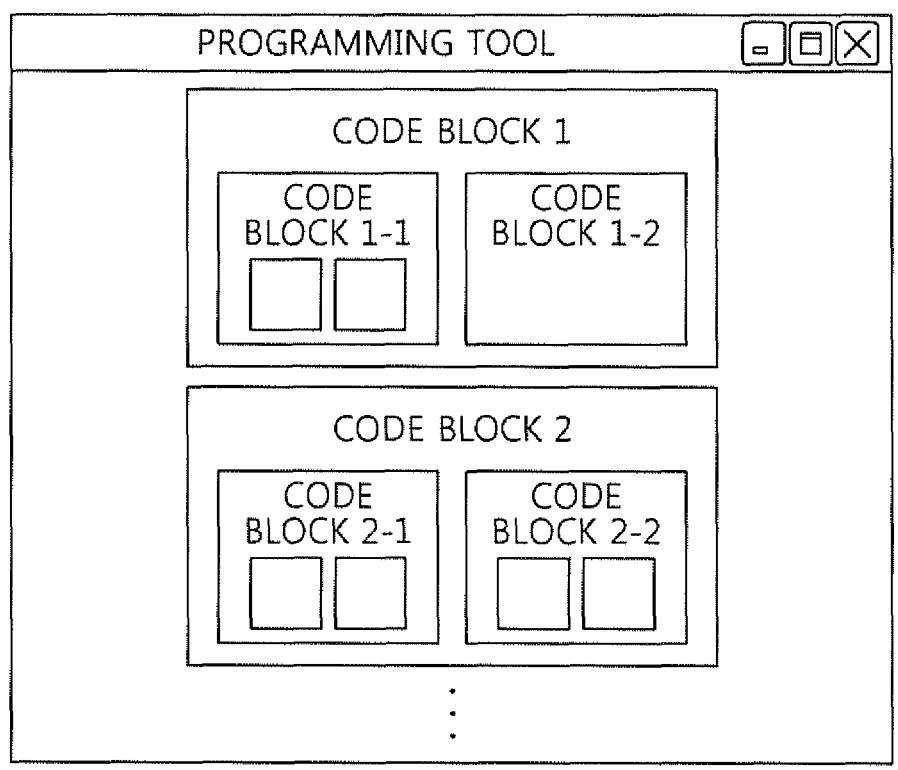
FIG. 2 is a diagram showing the structure of code blocks displayed on a display unit according to an embodiment of the present invention.
Figure 3:
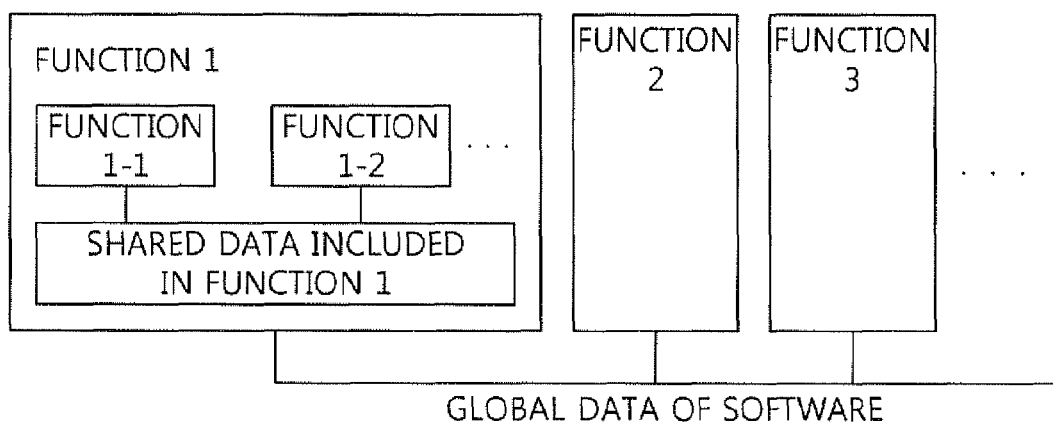
FIG. 3 is a conceptual diagram showing data sharing between code blocks according to an embodiment of the present invention.
Figure 4:
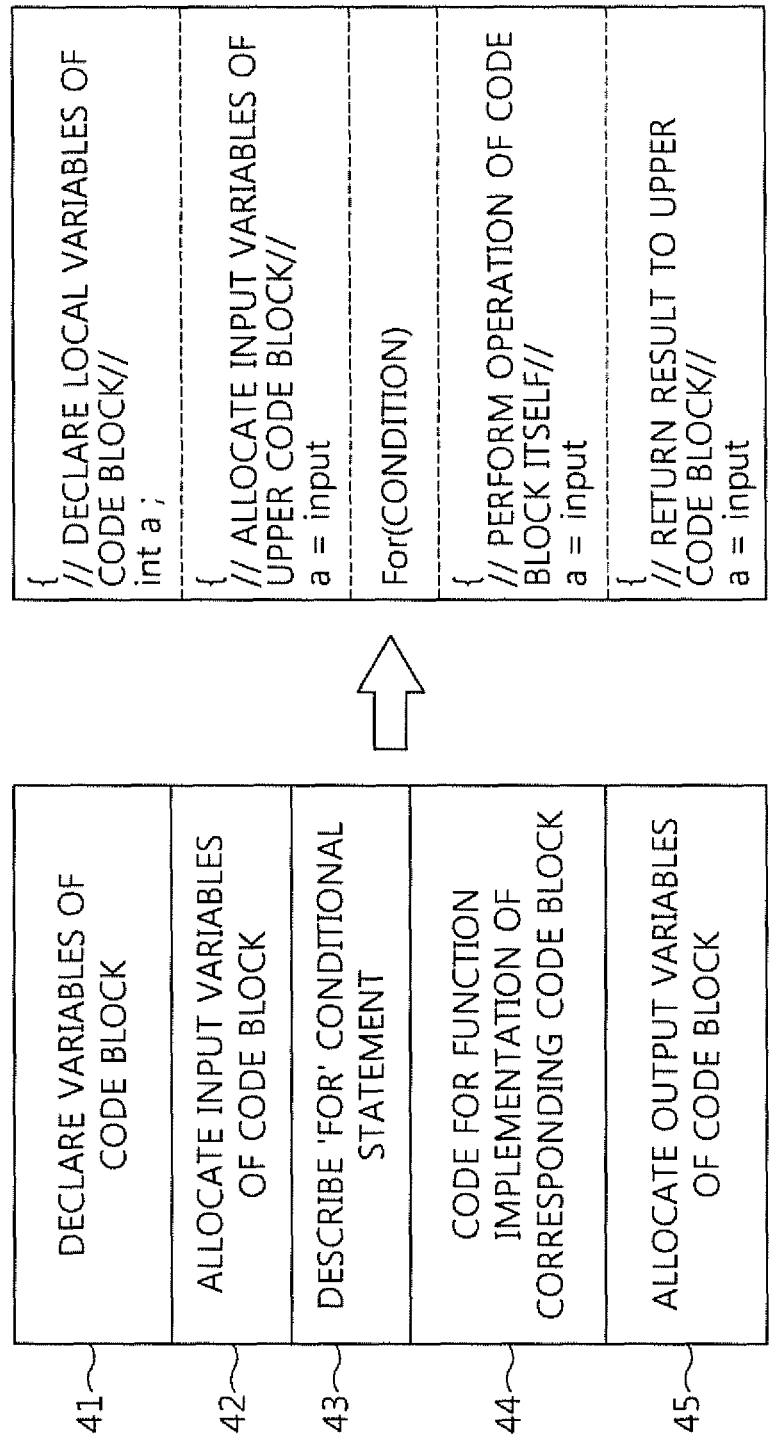
FIG. 4 is a diagram showing code blocks and a method for implementing software code using the code blocks according to an embodiment of the present invention.
Figure 5:
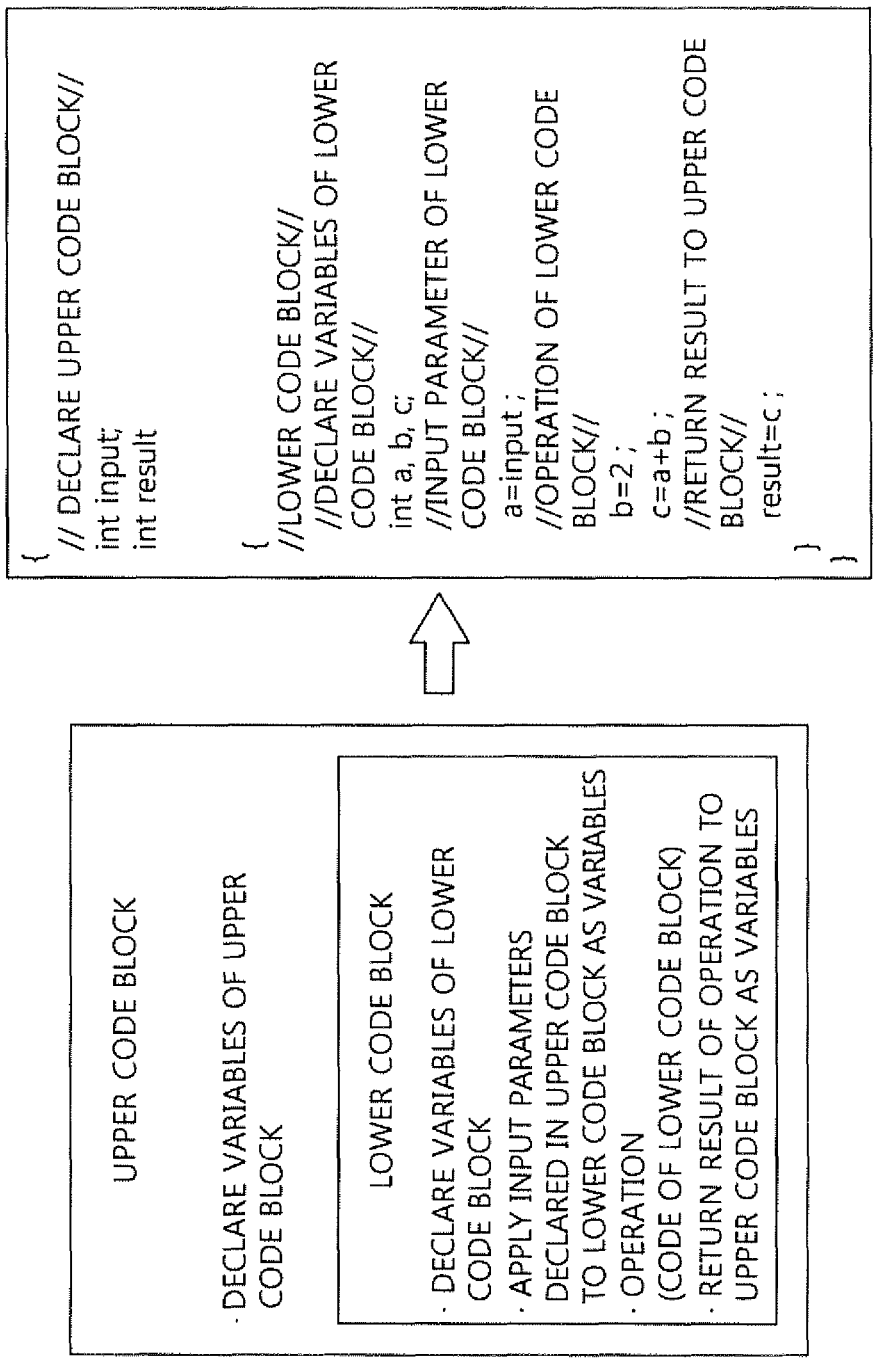
FIG. 5 is a diagram showing a procedure for converting generated code blocks into code according to an embodiment of the present invention.
Figure 6:
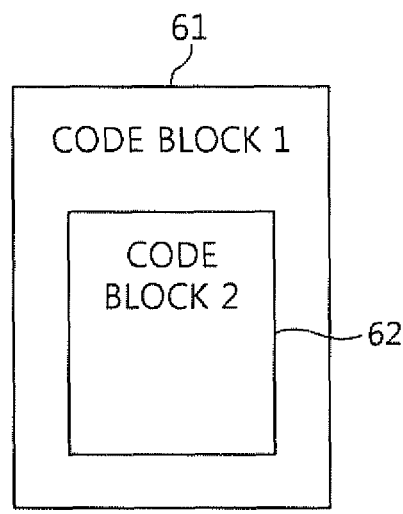
FIGS. 6 and 7 are diagrams showing the relationship between code blocks according to an embodiment of the present invention.
Figure 7:
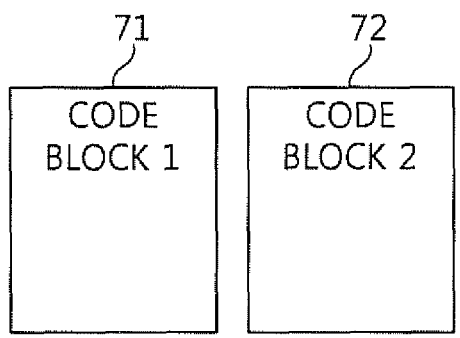
Figure 8:
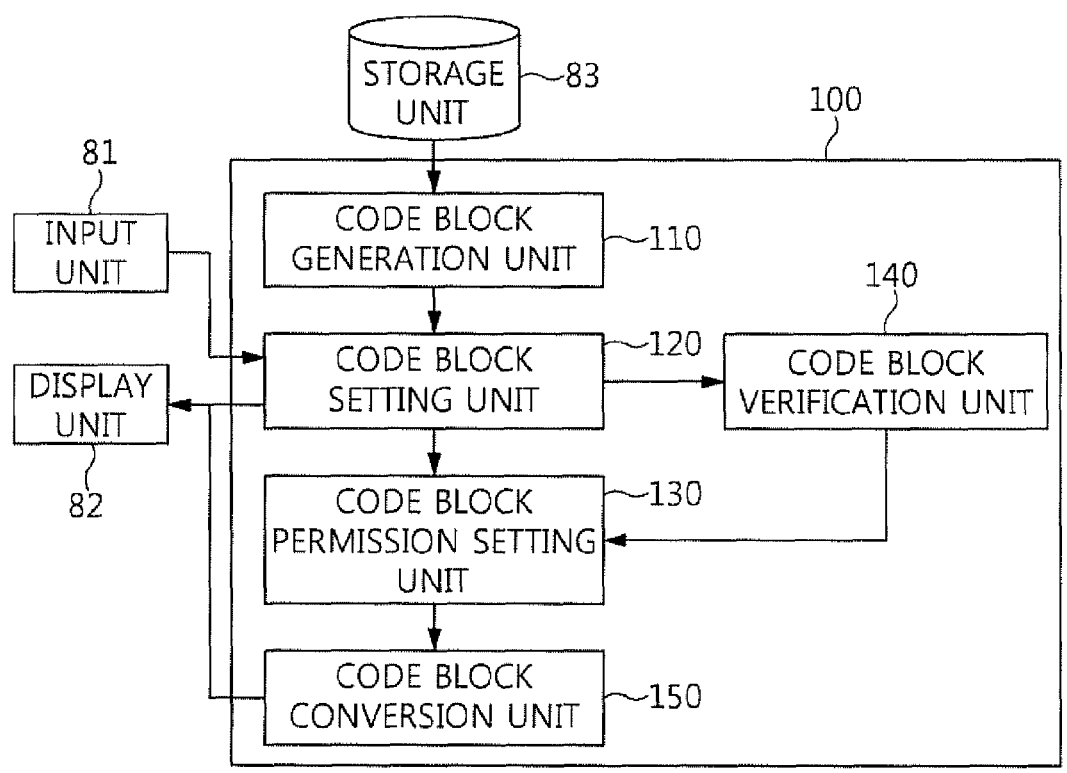
FIG. 8 is a block diagram showing a device for visually implementing software code according to an embodiment of the present invention.
Figure 9:
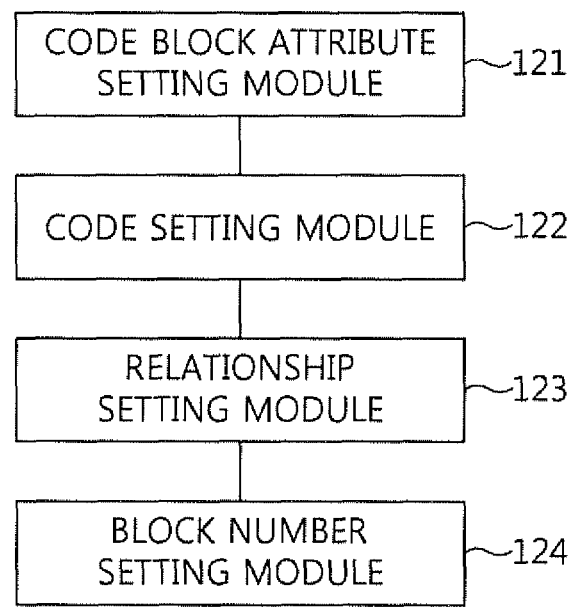
FIG. 9 is a block diagram showing the code block setting unit included in the device for visually implementing software code according to an embodiment of the present invention.
Figure 18:
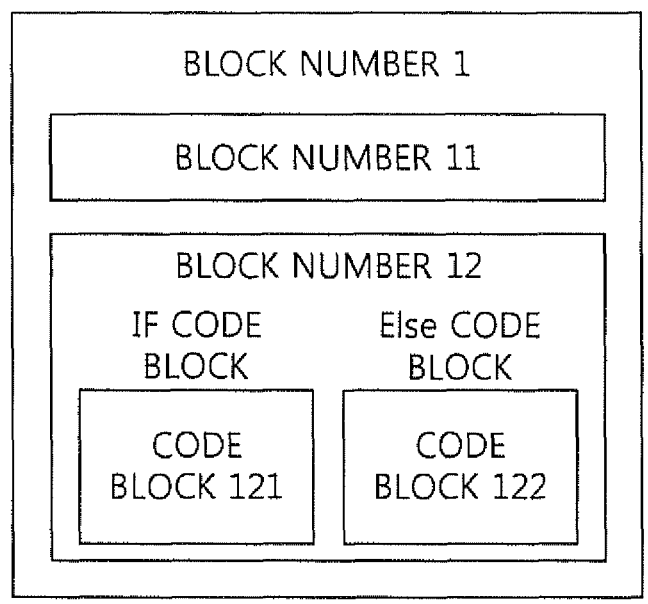
FIG. 18 is a diagram showing a method for allocating block numbers to multiple code blocks according to an embodiment of the present invention.
Figure 19:
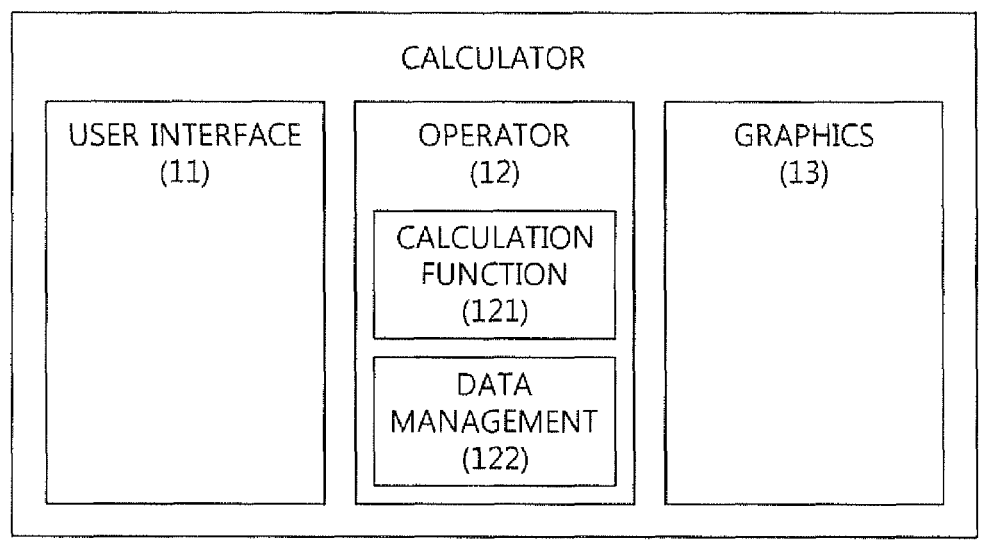
FIG. 19 is a diagram illustrating the display of code blocks to which indexes are added according to the present invention.
Figure 20:
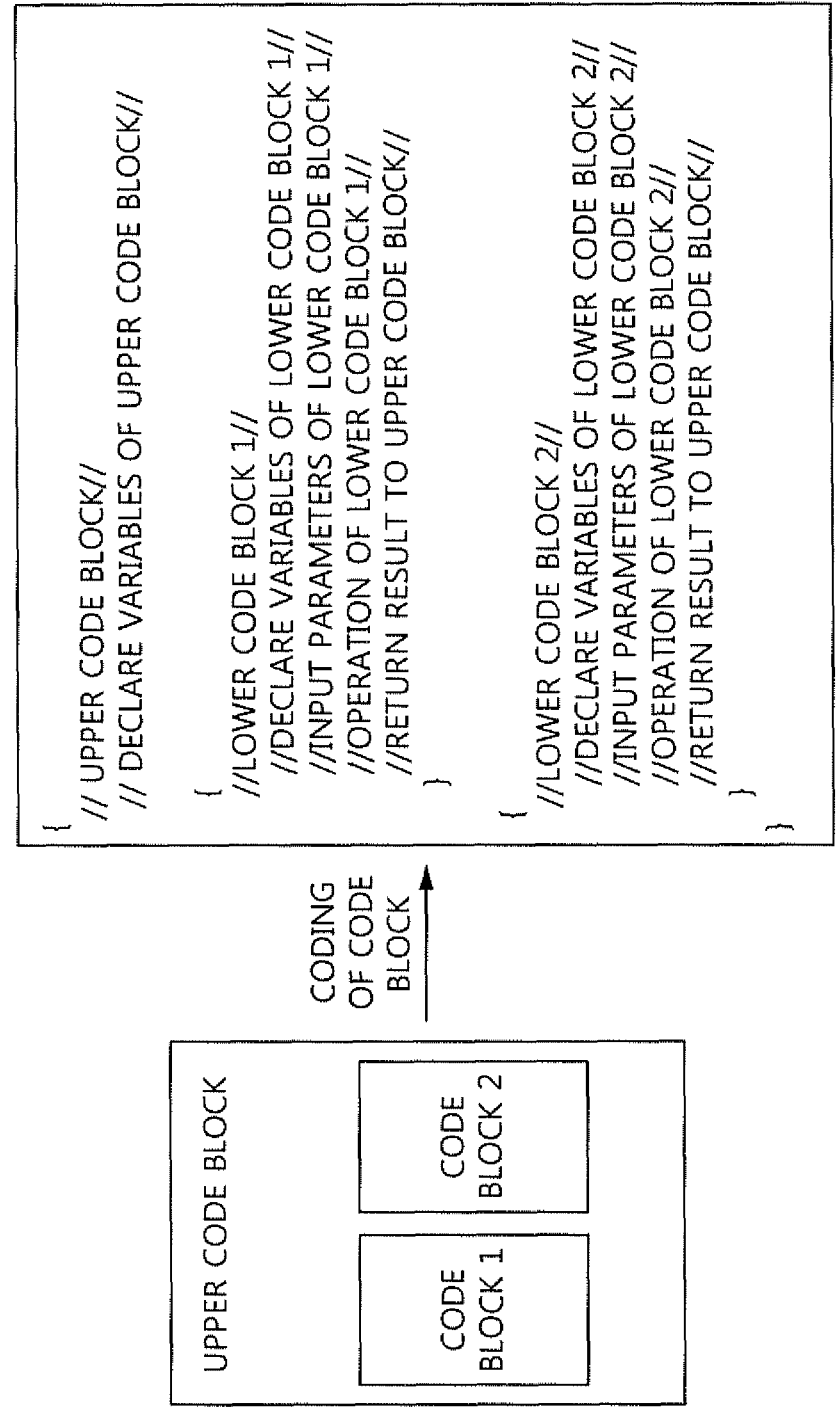
FIG. 20 is a diagram illustrating the conversion of code blocks into code using a code block conversion unit included in the device for visually implementing software code according to the present invention.
Figure 21:
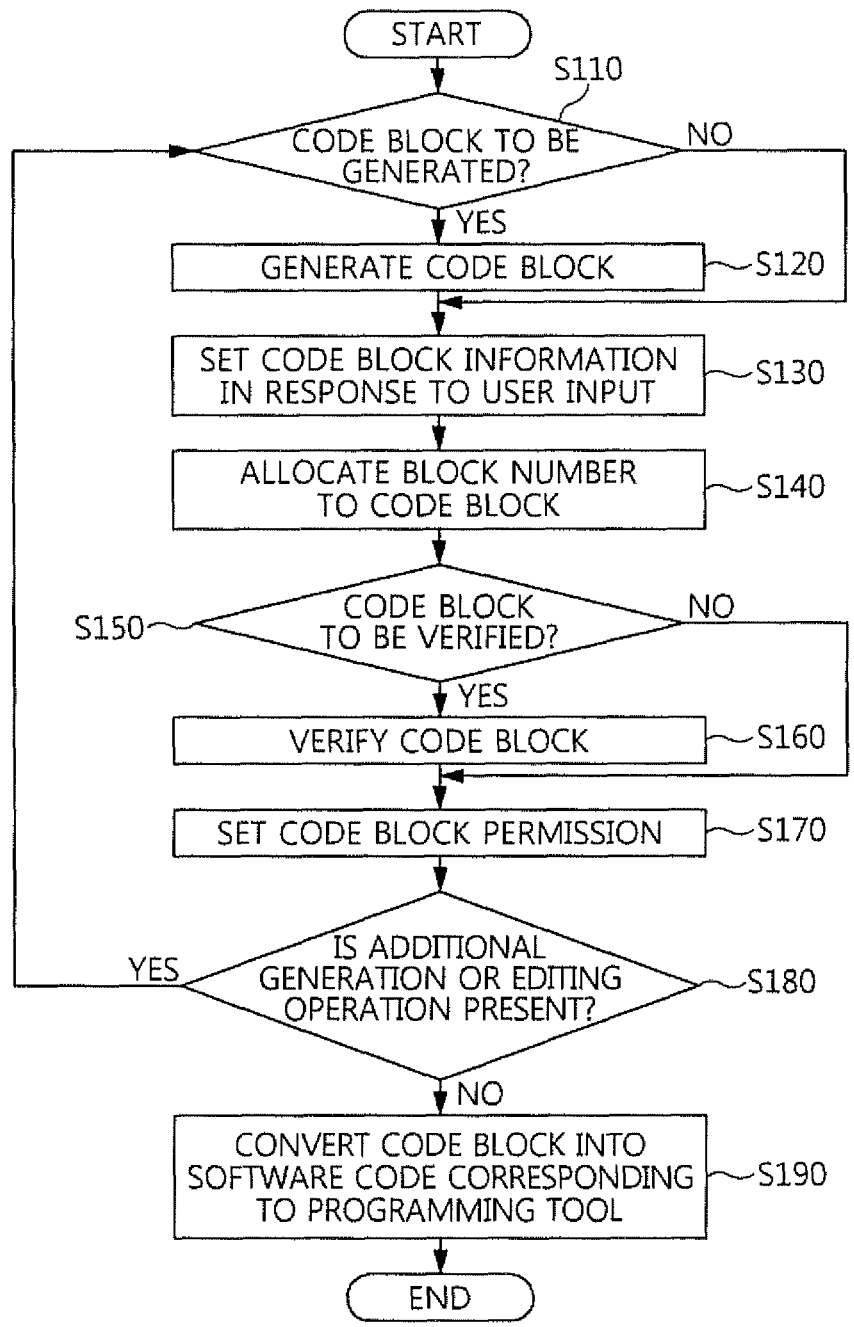
FIG. 21 is a flowchart showing a method for visually implementing software code according to an embodiment of the present invention.
Figure 22:
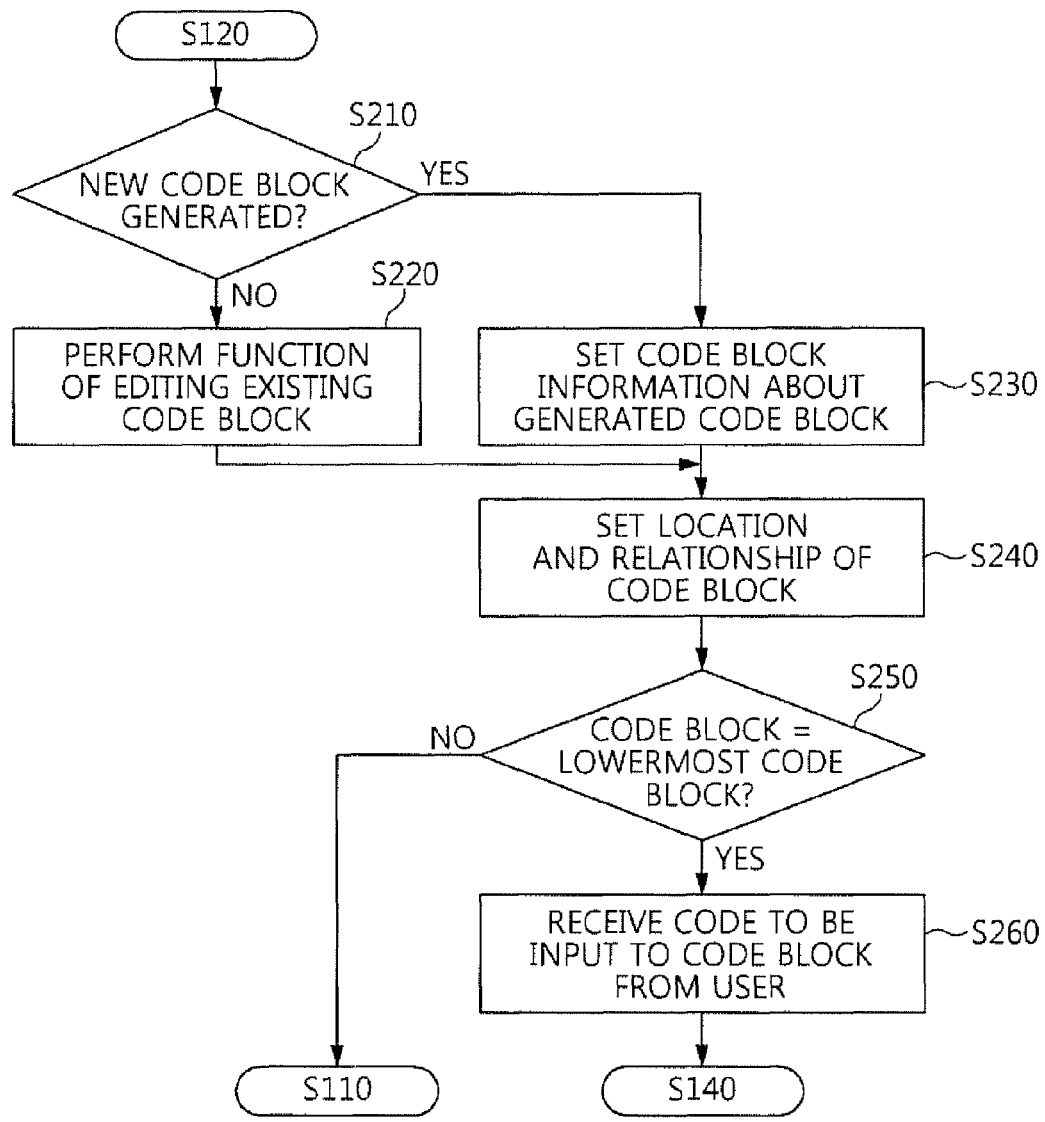
FIG. 22 is a flowchart showing the step of setting code block information in response to user input in the method for visually implementing software code according to an embodiment of the present invention.

FIG. 1 is a conceptual diagram showing a method for implementing software code using a device for visually implementing software code according to the present invention. FIG. 2 is a diagram showing the structure of code blocks displayed on a display unit according to an embodiment of the present invention. FIG. 3 is a conceptual diagram showing data sharing between code blocks according to an embodiment of the present invention. FIG. 4 is a diagram showing code blocks and a method for implementing software code using the code blocks according to an embodiment of the present invention. FIG. 5 is a diagram showing a procedure for converting generated code blocks into code according to an embodiment of the present invention. FIGS. 6 and 7 are diagrams showing the relationship between code blocks according to an embodiment of the present invention. FIG. 8 is a block diagram showing a device for visually implementing software code according to an embodiment of the present invention. FIG. 9 is a block diagram showing the code block setting unit included in the device for visually implementing software code according to an embodiment of the present invention. FIGS. 10 to 17 are diagrams showing the types of code blocks stored in a storage unit according to an embodiment of the present invention. FIG. 18 is a diagram showing a method for allocating block numbers to multiple code blocks according to an embodiment of the present invention. FIG. 19 is a diagram illustrating the display of code blocks to which indexes are added according to the present invention. FIG. 20 is a diagram illustrating the conversion of code blocks into code using a code block conversion unit included in the device for visually implementing software code according to the present invention. FIG. 21 is a flowchart showing a method for visually implementing software code according to an embodiment of the present invention. FIG. 22 is a flowchart showing the step of setting code block information in response to user input in the method for visually implementing software code according to an embodiment of the present invention.

Hereinafter, a method and device for visually implementing software code according to embodiments of the present invention will be described in detail with reference to the attached drawings.

As shown in FIG. 1, a user performs software coding using a programming tool. Here, the user may perform coding on a per-code block basis, as shown by reference numeral 20, rather than performing conventional coding for each line. Furthermore, individual code blocks are independent of each other.

Here, the term "code block" denotes one of components constituting software. Below, a code block will be described, but the present invention is not limited to such a code block, which is an example of a component, but relates to all components in which software may be hierarchically structured.

Code blocks are obtained by dividing the functionality of software into block units, and each code block may be configured to include function information 31, description information 32, code information 33, and a management number 34, as shown by reference numeral 30. As described above, a conventional coding scheme performs coding in one dimension (1D), and thus a problem arises in that the readability of previously implemented software code is deteriorated, and the meaning of each piece of code is unclear. In contrast, as shown by reference numeral 30, the code block of the present invention is advantageous in that, for each code block, the function information 31, the description information 32, the code information 33, and the management number 34, which the corresponding code block indicates, may be immediately understood, thus allowing the user or the operator to intuitively and definitely identify the meaning of the corresponding portion. Here, the meanings of the function information 31, the description information 32, the code information 33, and the management number 34 are described as follows.

The function information 31 denotes a description of a function that is derived to implement software or that is designed by concretizing the user's requirements. That is, the function information 31 may include comprehensive information about the corresponding code block.

Here, the user's requirements have a layered structure and do not have a control step. Further, each requirement takes charge of its own role in the code block. Furthermore, each requirement may have an index according to its own characteristic. In addition, the requirements may form a group, and such a group may also be represented by an index.

The description information 32 may include a detailed or concrete description of the above-described function information. Here, information included in the description information 32 may include various types of information, for example, a detailed description, a drawing, and a diagram of a function. That is, the user may more intuitively understand software code using the description information 32.

The code information 33 may include information about code required to implement software, or lower code blocks constituting a certain code block. Here, a detailed description of the lower code blocks will be made later with reference to FIG. 4.

The management number 34 is a number that is required by the user or the operator to manage each code block, and that is assigned by the user or the operator.

Further, as shown by reference numeral 20, code blocks may be implemented in a layered tree structure. Furthermore, such code blocks may also be shown as a layered block structure, as shown in FIG. 2, as well as a layered tree structure. The code blocks implemented in the layered tree structure or layered block structure are implemented to have a one-to-one correspondence relationship with functions constituting software, as described above. That is, when functions are structured as code blocks, the functions defined in the code blocks are coded, and then the sharing of data and the flow of control between blocks are clearly defined, the code composed of code blocks may be represented in a normal programming language.

The data sharing and control flow between blocks will be described in detail below. Data sharing is intended to structure code blocks such that an upper code block possesses all of the input/output data required by lower code blocks as the inner data thereof, and control flow is intended to separate control flow from data flow by enabling control flow to be present only between identical layers in the layered block structure. In other words, assuming that multiple lower code blocks are present in a single code block, the input/output data of all of the lower code blocks may be manipulated like global variables because all of the lower code blocks may access all pieces of data required thereby in the upper code block, wherein the control flow needs only to be defined between the lower code blocks. Such a structure is applied to all layers and the control flows defined in respective layers are associated with control flows defined between the lower code blocks, and thus the code blocks are sequenced.

Here, the method for determining control flow is performed such that, as the sequence of upper code blocks is designated, the sequence of lower code blocks is determined in the designated sequence of the upper code blocks. That is, the sequence of code blocks may be designated in the sequence of block numbers of code blocks, that is, 1, 1-1, 1-1-1, 1-1-2, 1-2, 1-2-1, 1-2-2, 2, and 2-1.

Further, the method for sharing data has the characteristic that an upper code block must possess input/output data required by lower code blocks, and this characteristic may be applied to all layers. For example, it is assumed that software includes function 1 and function 2. Further, function 1 is assumed to include, in detail, function 1-1 and function 1-2. As shown by reference numeral 20 of FIG. 1 and as also shown in FIG. 2, these functions may be implemented such that function 1 corresponds to code block 1 and function 2 corresponds to code block 2. Here, the control flow is determined in the sequence of function 1, function 1-1, function 1-2, and function 2.

FIG. 3 is a conceptual diagram showing data sharing between code blocks according to an embodiment of the present invention, and illustrates in detail the concept in which data is shared between code blocks in a defined data region.

Code blocks may be divided into upper code blocks and lower code blocks. Here, each upper code block must define and manage data to be shared by lower code blocks. That is, each upper code block must possess all input/output data required by the lower code blocks. This principle is identical to, for example, the principle in which data is defined as global variables in a normal programming language and in which the global variables are used in individual regions (lower code blocks).

As shown in FIG. 3, the upper code block manages data in a region composed of at least one lower block, and this structure may be continuously layered. For example, in the case of C language, local variables in several layers are infinitely supported using multiple braces ('{' or '}'), and the local variables that the upper code block has may play the same role as local variables that may be accessed by lower code blocks.

Below, code blocks and a method for implementing software code using the code blocks according to an embodiment of the present invention will be described in detail with reference to FIG. 4.

That is, an action for adding a new code block in a tool for implementing software using code blocks denotes the generation of a new code block at the position where the corresponding code block is to be included. In the supporting tool for implementing code blocks, even if an initial code block is not added, the uppermost code block is always present. For example, in the C programming language, the uppermost code block may be defined as a Main( ) function. Further, when a code block is added, the definition of a conditional statement, the definition of input/output variables, the definition of the sequence of code blocks (block numbers), and the declaration of variables in the corresponding code block are required depending on the type of code block that is selected.

As shown in FIG. 4, the user may implement the internal attribute code of each code block via a coding window. In detail, the code block may separately manage details, such as the declaration of variables of the code block/allocation of input variables of the code block/conditional statement/function implementation code of the corresponding code block/allocation of output variables of the code block, via the coding window, and may locate related code at the corresponding location when code is implemented. Such a coding window may be configured to include at least one of a variable declaration window 41, an input variable allocation window 42, a conditional statement window 43, a code input window 44, and an output variable allocation window 45. That is, in the coding window, the user may select a required window without utilizing all of the windows, and may use the selected window to perform coding.

Here, the variable declaration window 41 is used to declare all of the variables used in the code block (i.e. all of the variables used to implement the function of the code block), and the input variable allocation window 42 is used to allocate an input variable. Further, the conditional statement window 43 is used to declare a conditional portion in the coding of a conditional statement (e.g. an 'If' or 'Switch' control statement) and the coding of a loop statement (e.g. 'While', 'For', or 'Do while' control statement). Furthermore, the code input window 44 is used to input internal attribute code that is required to substantially define the performance of functions in the coding of a declarative statement, the coding of a conditional statement, and the coding of a loop statement. Finally, the output variable allocation window 45 is used to return a value from the corresponding code block to an upper code block.

As described above, when the code block is added, information about the declaration of variables of the code block/allocation of input variables of the code block/conditional statement/allocation of output variables of the code block may be managed in the internal attribute code of the code block. Since the main content of the corresponding code block is the function implementation code of the code block, the user or the operator may define the internal attribute information of the code block depending on the location and the role of the code block, thus concentrating on the completion of function implementation code, which is the main content.

Further, the windows 41, 42, 43, and 45 for declaration and allocation of variables shown in FIG. 4 enable the corresponding details to be defined in separate regions, and may be managed separately from the code required to implement the function of the corresponding code block (i.e. internal attribute code input via the code input window). When a code block is added, the code block may be used such that, in window portions other than the code input window 44, functions are defined in the internal attribute information region of the corresponding code block. The details managed as the internal attribute information of the code block may be coded in the sequence of FIG. 4 when being converted into software code.

The internal attribute code of the code block, set via the coding window in this way, may be converted into code in a programming language preset by the user.

Below, a procedure for converting a generated code block into code according to an embodiment of the present invention will be described with reference to FIG. 5. More specifically, with reference to FIG. 5, a procedure for, when an upper code block includes a lower code block, converting these code blocks into code, will be described.

The code blocks represented in code may have characteristics similar to those of a function in the C language. That is, the function in the C language has local variables used within the function, and may load parameters to be used in the function from outside the function. Further, the function may return a specific value as a result value.

Since a function in C language is identical to a black box, it is observed to derive a specific result when a specific value is input from the standpoint of data sharing in relation to the action that is conducted in the function. That is, when an external parameter is input, the function is intended to perform its appointed action or return a result value, and may have its own data region. Further, when such functions are sequentially called in the sequence thereof, the functions may be divided into software components for performing the function thereof.

As described above, data sharing and control flow between blocks will be described below. Data sharing is intended to structure code blocks such that an upper code block possesses all of input/output data required by lower code blocks as the inner data thereof, and control flow is intended to separate control flow from data flow by enabling control flow to take place only between identical layers in the layered block structure. In other words, assuming that multiple lower code blocks are present in a single code block, input/output data of all of the lower code blocks may be manipulated like global variables because all of the lower code blocks may access all pieces of data required thereby in the upper code block, wherein the control flow needs only to be defined between the lower code blocks. Such a structure is applied to all layers and the control flows defined in respective layers are associated with control flows defined between the lower code blocks, and thus the code blocks are sequenced.

Here, since the method for determining control flow and the method for sharing data have been described in detail above, a repeated description thereof will be omitted.

The code blocks may have the characteristics of data region and control flow. In detail, the difference between the operation of a function in C language and a code block is that the function may be called and used in common by various types of code at specific times, but the code block may belong to a specific location and may independently perform a designated role.

For example, it is assumed that there is a code block having a management number of 3 and that a code block having a management number of 32 belongs to the code block having a management number of 3. In this case, after the code block having a management number of 32, which belongs to the code block having a management number of 3, receives an input parameter from the code block having a management number of 3 and performs an operation, it returns an appointed output parameter to the code block having a management number of 3. Here, all parameters and actions in the code block having a management number of 32, except for the input/output data, may be executed independently within the code block having a management number of 32. Also, this execution never influences any other code blocks, as well as the code block having a management number of 3, which is the upper code block.

In the C language, code having the above characteristics may be implemented using functions, but the C language does not support the declaration of a function within another function, and thus the present invention implements code blocks using braces ({ }). Braces may be one of methods for dividing a region in C code into blocks, and variables declared in the braces are local variables recognized only in the corresponding region. Such details may be further clarified with reference to FIG. 5. That is, an upper code block has a structure including a lower code block, and the code blocks may be displayed to be distinguished from each other by braces.

Further, code blocks are implemented using a method for reallocating a variable (input parameter) declared in upper braces (upper code block) to variables declared in lower braces (lower code block), performing an operation based on the variables, and finally returning the result value as a variable (output parameter) declared in the upper braces (upper code block). That is, since all actions processed in each code block are performed using the local variables of the code block, the code block may maintain an independent relationship with other code blocks. When the following features are satisfied, code blocks may be generated using any method.

Furthermore, as described above, code blocks may have an inclusion relationship therebetween, but may also have a parallel relationship therebetween. Such details may be further clarified by referring to FIG. 6, in which the code blocks are implemented in the above-described inclusion relationship, and FIG. 7, in which code blocks are implemented in a parallel relationship.

That is, the inclusion relationship shown in FIG. 6 may be defined as a relationship in which at least one code block is present in another code block. In the code blocks having an inclusion relationship, an upper code block does not have separate code, with the exception of the declaration of variables used in the upper code block. Accordingly, the control flow of code blocks having an inclusion relationship is implemented such that a variable declaration portion in an upper code block is coded first, and then the code of the code block included in the upper code block needs only to be arranged. Therefore, when the location of the code of the upper code block is determined by the control flow of the code blocks in a parallel relationship which will be described later, the sequence of pieces of code between lower code blocks is determined within the range of the determined code location, and thus all of the code of the software may be configured.

Further, as shown in FIG. 7, a relationship in which code blocks are included in the same upper code block, rather than having an inclusion relationship therebetween, is defined as a parallel relationship. The code blocks in a parallel relationship must be sequenced. For example, as illustrated in FIG. 7, when the control flow is defined such that one code block is a No. 1 code block and the other code block is a No. 2 code block, the form of the code blocks is converted into software code, such as in the above-described form shown in FIG. 5.

Hereinafter, the device for visually implementing software code according to an embodiment of the present invention will be described in detail with reference to FIG. 8. FIG. 8 is a block diagram showing a device for visually implementing software code according to an embodiment of the present invention. As shown in FIG. 8, the device for visually implementing software code according to the embodiment of the present invention may be configured to include a code block generation unit 110, a code block setting unit 120, a code block permission setting unit 130, a code block verification unit 140, and a code block conversion unit 150. Below, these components will be described in detail.

The code block generation unit 110 functions to generate code blocks that are used to implement software code on a per-block basis depending on the requirements and functions of a client, with respect to the implementation of software.

More specifically, the code block generation unit 110 derives requirements, which may be implemented as a single code block. Here, the requirements have a layered structure and do not have a control step. Furthermore, the requirements play their roles in the code to be implemented subsequently. Furthermore, the requirements may have indexes depending on their characteristics. In addition, the requirements may form groups, which may also be represented by indexes.

The code block generation unit 110 generates code blocks using the requirements, wherein the code blocks may have a control step, and the respective requirements may be allocated to the code blocks. Here, the generation of code blocks may be chiefly divided into two schemes. That is, a first generation method is to generate code blocks having all empty attributes in the code window shown in FIG. 4. Further, a second generation method is to generate code blocks by calling the form of code blocks pre-stored in a storage unit 83. That is, the storage unit 83 may include various forms of code blocks. More specifically, the storage unit 83 may include a declarative statement code block, a loop statement code block, and a conditional statement code block depending on the control flow. Here, the types of code blocks stored in the storage unit 83 are described as follows.

Here, an example of a declarative statement code block is illustrated in FIG. 10. FIG. 10 illustrates a so-called 'Goto Next' code block, which is a normal code block in which no separate control flow is present. More specifically, the 'Goto Next' code block is a normal code block and may designate code blocks so that a subsequent code block is present subsequent to the corresponding code block.

Examples of the loop statement code block are illustrated in FIGS. 11 to 13. FIG. 11 illustrates a 'For' code block, FIG. 12 illustrates a 'While' code block, and FIG. 13 illustrates a 'Do while' code block. The loop statement code blocks illustrated in FIGS. 11 to 13 are code blocks for performing a function of a loop statement for repetitively performing a predetermined action in a given code block while a desired condition is satisfied. However, from the standpoint of code blocks, even if the internal action of the loop statement is repetitively performed, this is consequently identical to the situation in which a targeted task is performed at the sequential position of the corresponding code block. That is, it may be considered that the action of the code block is performed once.

Examples of the conditional statement code block are illustrated in FIGS. 14 and 15. That is, FIG. 14 illustrates a 'Switch' code block, and FIG. 15 illustrates an 'If' code block. The loop statement code blocks described in FIGS. 14 and 15 denote code blocks for performing a given function when an input variable meets a specific condition.

Meanwhile, code blocks may further include a function code block, which will be described below. The function code block denotes a code block implemented as a function, and examples thereof are illustrated in FIGS. 16 and 17. Such a function code block may be declared, defined, and used in the uppermost block, similarly to the use of a function in C language. As shown in FIG. 16, a function code block is identical to other code blocks in local variable declaration/input variable allocation/operation performance/result returning functions, but is different from them in that a function name (parameter) is additionally declared and is additionally used as the name of the block. For this reason, the function code block may be declared in the uppermost block.

The code block setting unit 120 shown in FIG. 8 performs a function of setting a code block attribute or code included in the code block based on information input from the user. Here, as described above with reference to FIG. 1, the code block attribute includes function information and description information about the corresponding code block. That is, the code block attribute is intended to solve the problem of the conventional coding scheme in which coding is performed in one dimension and the readability of code is deteriorated, and includes both a brief description and a detailed description of a function which is designed by concretizing requirements derived when software is implemented. In detail, the function information denotes a description of a function which is derived to implement software or which is designed by concretizing the requirements of the user, and the description information includes a detailed description of the above-described function information. Here, the information included in the description information may include, for example, various types of information such as a detailed description, a drawing, and a diagram of a function. By means of this code block attribute, the user may more intuitively understand the code block, unlike the conventional coding scheme in which code is represented in one dimension, for example, using a comment.

Further, as described above with reference to FIG. 4, the internal attribute code may be set by the user via a coding window. Here, the coding window may be configured to include a variable declaration window, an input variable allocation window, a conditional statement window, a code input window, and an output variable allocation window. Since the descriptions of respective windows have been made above, descriptions of duplicated portions will be omitted. The code block attribute and internal attribute code, set in this way, are displayed such that, when a request for the display of the corresponding code block is received from the user, the function information, description information, and internal attribute code of the code block are displayed on a display unit 82.

Further, when multiple code blocks are generated by the code block generation unit 110, the code block setting unit 120 may classify the multiple code blocks in a layered tree structure or a layered block structure depending on the user's settings. Examples of this classification are shown in FIGS. 1 and 2. The layered structures classified in this way are advantageous in that they may assist the user or the operator in intuitively analyzing software. Further, there is an advantage in that, by means of this structuring, the management of software is further facilitated even in subsequent software editing.

For example, the case is assumed where the user or operator copies one of multiple code blocks included in the layered tree structure or layered block structure to another location. That is, when software is configured using code blocks, code blocks that perform the same function but belong to different locations may be present, and code blocks that have similar functions may be present. Here, a code block may be copied and pasted to lower code block subordinate to another code block. When the code block is pasted, the management number/input variable declaration/output variable declaration are deleted, and a block number is automatically allocated according to the location of the corresponding code block. The data preserved by copying the code block is divided into function(requirements)/description and internal variable declaration of code in code details/condition/function implementation code. When the code block to be copied is selected, lower code blocks subordinate to the selected code block are copied together. All data about the lower code blocks subordinate to the copied code block may be maintained unchanged.

Further, the code blocks may be classified into upper code blocks and lower code blocks depending on the locations in the layered tree structure or the layered block structure. Furthermore, as described above, internal attribute code included in each lower code block is implemented independent of an upper code block, and the upper code block performs only a variable declaration function therein, but does not include additional code. That is, an upper code block includes only shared data required by lower code blocks (which function as a data bus so that data may be shared between lower code blocks) and includes only one or more lower code blocks, and one or more lower code blocks receive an input parameter from the upper code block, and return an output parameter to the upper code block.

Also, the code block setting unit 120 may automatically allocate block numbers depending on the locations of code blocks in the layered tree structure or the layered block structure. For example, the case is assumed where two code blocks are included in a single code block (see FIG. 18). As shown in FIG. 18, it is assumed that the block number of the uppermost code block is set to '1'. Here, the uppermost code block includes two lower code blocks, and these lower code blocks are allocated block numbers 11 and 12, respectively. When the code block having a block number of 12 further includes, for example, two code blocks, these two code blocks may be allocated block numbers 121 and 122, respectively. This method for allocating block numbers is only an example, but may be applied as various different schemes. Further, since the code blocks having block numbers 11, 121, and 122 are lowermost code blocks, they may be implemented to include internal attribute code. In contrast, since the code blocks having block numbers 1 and 12 include lower code blocks, respectively, they do not include separate code, with the exception of code for variable declaration.

Also, the code block setting unit 120 may additionally set an index for each code block. That is, when software includes only several code blocks, the management of the software is easy, but, in actual implementation, a large number of code blocks may be used to implement a single software program. In this case, in order to more intuitively notify the user or the operator what the corresponding code block indicates, an index may be added to the corresponding code block. By means of this index, each code block may manage index/function (requirements)/description/code using both a management number and a block number, and predetermined regions or the entire configuration of the code block may be individually represented by index/function (requirements)/description/code as the occasion demands. An example of this is illustrated in FIG. 19.

That is, as shown in FIG. 19, there may be the case where a calculator is implemented using software. This calculator may include a code block indicating a user interface, a code block indicating an operator, and a code block indicating graphics. Here, such an indexing function is added to the code blocks so that what the code blocks correspond to is clarified, thus allowing the user or the operator to easily carry out programming.

Further, such indexes may also include indexes for variables managed by an upper code block, as well as the indexes of code blocks. That is, an upper code block may include several steps of lower code blocks, and may manage a large number of variables depending on the circumstances. In this case, referring to C language by way of example, variables may be combined using a structure, and such a structure may also be managed via an index, thus enabling software to be more clearly and externally managed.

The code block permission setting unit 130 functions to set access permission for code blocks in order to set permission for access by other users. In greater detail, the code block permission setting unit 130 may set the permission of each, at least a part, or all of code blocks in the entire code block structure. The selected code block may be designated to include a lower code block, and to designate security so that a lower code block is not included in the selected code block. The code block for which security is set may be configured such that persons other than a permitted person cannot view function/description/function implementation code, or such that permission to modify the code is restricted. Such access permission may be individually set for function/description/internal attribute code. The setting of access permission may be performed such that only some code blocks may be viewed by other persons. For code blocks, security may be set in several steps (e.g. such that code blocks are not viewed/such that code blocks are viewed, but cannot be modified/such that input/output variables and messages cannot be modified/such that all data can be modified). A function of setting security such that variables and messages in specific code blocks are used only in code blocks designated by a manager is supported.

The code block verification unit 140 performs a function of repeatedly receiving input variables included in code blocks using a random variable and verifying code blocks.

For example, when the user selects a code block to be verified, the code block becomes a verification unit together with the lower code blocks subordinate to the selected code block. Thereafter, a screen implemented using a portion composed of input/output parameters and a conditional portion of the input/output parameters is displayed on the display unit 82. Here, when the input/output conditions for respective input/output parameters are specified in the conditional portion, and verification is performed, input variables are continuously input using a random variable within the range specified in the corresponding condition, and thus code may be automatically verified via the input of various variables until the operator stops verification.

Here, the verification method may be performed in such a way as to use a random variable or to sequentially verify input and output values of variables for all values falling within a condition. Verification may be performed using a method of reporting an error occurrence location when an error occurs via a test (by recognizing the code block to which the line of code, reported by a compiler when a compile error occurs, belongs) or a method of reporting the name of an output variable in which an error occurs, among the conditions of output variables. When verification is performed, the states of the use of memory of a computer, the use of a Central Processing Unit (CPU), etc. may be displayed in conjunction with a test result screen. The conditions of the input variables/output variables are configured using numerals and symbols (<, >), and may be repetitively represented. When a sequential test is selected from the verification method, all numerals represented by the corresponding variable are sequentially applied to verification according to the declared type of variable, and then verification is performed. The start and end of verification are implemented such that, when the application of all numerals is terminated, verification is automatically terminated, or such that, when the operator presses an end button, verification is terminated.

Further, in the drawing, although the code block verification unit 140 is shown as performing verification only after the setting of code blocks, this is merely intended to help the understanding of the present invention, and verification may be performed at any step after the setting of code blocks.

When a request is received from the user, the code block conversion unit 150 functions to convert the code blocks into code corresponding to a preset programming language. An example of this conversion is illustrated in FIG. 20. The upper code block shown in FIG. 20 includes two lower code blocks, which are included in a parallel relationship in the upper code block. Further, since this code conversion method has been described in detail above, a repeated description of duplicated portions will be omitted. Furthermore, in relation to code block conversion, a description has been chiefly made based on C language in the present specification, but this description is only an example for helping the understanding of the specification, and the present invention may be applied to various languages of different types.

Although, in the drawings, the code block conversion unit 150 is shown as performing conversion only after permission for code blocks has been set, it is merely intended to help the understanding of the invention, and conversion may be performed at any step after the code blocks have been set.

Also, when software is implemented using code blocks, the device 100 for visually implementing software code according to the present invention may provide various view functions for code blocks to the user or the operator when verifying the flow or relational aspects of data using the correlation, variables or messages of related functionality. The code blocks have a function of displaying related code blocks based on block numbers/management numbers/variables and messages declared in the code blocks, in a layered tree structure or a layered block structure.

Here, the range of code block display may be variously set by including a specific code block. When variables declared in code blocks are references, variables input/output from an upper code block to a lower code block are recognized as identical variables, and thus all related code blocks may be displayed. A software implementation tool using code blocks may allocate attributes to respective code blocks. For example, a function related to the storage of data is defined as a single attribute, and the corresponding attribute may be defined in the code blocks related thereto. The defined attribute related to the storage of data may be selected, and only the code blocks related thereto may be displayed (in a tree structure/block structure). This attribute information may be repetitively set, and may also be defined as being duplicated in a single code block. Information about code in code blocks may be represented by a single piece of software code (the form of source code in C language). In the case of the function (requirements)/description, a function and a description may be simultaneously displayed based on a management number in the form of a single report.

Hereinafter, the code block setting unit will be further described with reference to FIG. 9. FIG. 9 is a block diagram showing the code block setting unit included in the device for visually implementing software code according to an embodiment of the present invention. As shown in FIG. 9, the code block setting unit 120 may be configured to include a code block attribute setting module 121, a code setting module 122, a relationship setting module 123, and a block number setting module 124. In the following description, a repetitive description of the above-described duplicated portions will be omitted.

The code block attribute setting module 121 functions to set a code block attribute in the corresponding code block. That is, the code block attribute setting module 121 sets function information and description information about each code block in the corresponding code block. This is possible by means of the input of the user through an input unit. As described above, such a code block attribute is devised to move beyond the conventional coding scheme in which coding is performed in one dimension and the readability of code is deteriorated, and includes a brief description (simple description of a function) and a detailed description (detailed description, a drawing, a diagram, etc.) of a function that is designed by concretizing requirements derived when software is implemented. By means of this code block attribute, the user may more intuitively understand the code block, unlike the conventional coding scheme in which code is represented in one dimension, for example, using a comment.

The code setting module 122 functions to set internal attribute code in each code block. As described above with reference to FIGS. 4 and 8, this internal attribute code may be set via code that is input by the user through a coding window. Further, the coding window may be configured to include at least one of a variable declaration window, an input variable allocation window, a conditional statement window, a code input window, and an output variable allocation window. A description thereof has been made in detail above, and thus a repeated description of duplicated portions will be omitted.

The relationship setting module 123 functions to, when multiple code blocks are generated by the code block generation unit 110, classify the multiple code blocks in a layered tree structure or a layered block structure depending on the settings of the user. Further, by way of this classification, the relationship setting module 123 may set the multiple code blocks to a parallel relationship or an inclusion relationship. Since the method for setting these relationships and the types of such relationships have been described in detail above, an additional description thereof will be omitted.

The block number setting module 124 functions to automatically allocate block numbers to code blocks depending on the locations of the code blocks in the layered tree structure or the layered block structure, set by the relationship setting module 123. This allocation method may be implemented such that x is allocated to the uppermost code block, xy is allocated to lower code blocks included in the uppermost code block, and xyz is allocated to the next lower code blocks. However, this implementation method is only an example, and may be implemented in various forms in which the locations of code blocks may be detected.

Hereinafter, a method for visually implementing software code according to an embodiment of the present invention will be described with reference to FIG. 21. FIG. 21 is a flowchart showing a method for visually implementing software code according to an embodiment of the present invention. In the following description, a repeated description of portions identical to those described above with reference to FIGS. 1 to 20 will be omitted.

First, whether to generate a code block is determined by the user at step S110. That is, the method for visually implementing software code according to the present invention may perform a function of allowing the user to newly generate a code block, but may also perform a function of editing pre-generated code blocks (e.g. copying, deleting, or editing). Accordingly, at step S110 of determining whether to generate a code block, such determination is required. Thereafter, if it is determined, at the step S110 of determining whether to generate a code block, that the user desires to generate a new code block, the step S120 of generating a code block is performed. If it is determined that the user does not desire to generate a new code block, the step S130 of setting a code block attribute or internal attribute code is performed.

At the code block generation step S120, the code block generation unit functions to generate a code block used to implement software code on a per-block basis depending on the requirements and functions. Here, the generated code block may include a basic empty frame, used when the user desires to newly edit a code block, and a declarative statement code block, a loop statement code block, and a conditional statement code block, which are stored in a storage unit. The types of code blocks have been described above in detail with reference to FIGS. 10 to 17, and thus an additional description thereof will be omitted. Further, when a code block is generated, the block number thereof is automatically allocated to the code block.

Thereafter, the code block setting unit sets code block information included in each code block, that is, a code block attribute or internal attribute code, based on the information input by the user, at step S130. This step S130 of setting the code block attribute or the internal attribute code may be configured such that, when, for example, the new code block is generated at the code block generation step S120, a code block attribute and internal attribute code for the generated code block may be set. Here, the code block attribute may include function information and description information, as described above. In this case, since the method for setting the code block attribute and the internal attribute code has been described in detail above, an additional description thereof will be omitted.

In addition, the step S130 of setting the code block attribute or the internal attribute code may further include the step of including the location, block number, management number, index, and internal attribute code of the code block in the corresponding code block. Further, although not shown in the drawing, the step of displaying function information, description information, and internal attribute code pertaining to the code block on the display unit when a request to display the code block is received from the user may be further included after the step S130 of setting the code block attribute or internal attribute code.

Further, at the step S130 of setting the code block attribute or the internal attribute code, when multiple code blocks are generated by the code block generation unit, the multiple code blocks may be classified in a layered tree structure or a layered block structure depending on the settings of the user. That is, the multiple code blocks may be formed in a parallel relationship or an inclusion relationship depending on the locations of the code blocks. Accordingly, even if multiple code blocks are present, the user may easily manage the multiple code blocks because they are configured in a layered tree shape or a layered block shape.

Further, as described above, the code blocks may be classified into upper code blocks and lower code blocks depending on the locations in the layered tree structure or the layered block structure. Furthermore, internal attribute code included in each lower code block may be implemented independent of the upper code block thereof.

Here, the upper code block includes one or more lower code blocks, wherein the one or more lower code blocks may receive an input parameter from the upper code block and may return an output parameter to the upper code block.

Also, code blocks may include a declarative statement code block, a loop statement code block, and a conditional statement code block depending on the control flow. A description thereof has been made in detail above with reference to 8 to 17, and thus an additional description thereof will be omitted.

At the step S140 where the code block setting unit sets a block number for the code block, the block number is automatically allocated depending on the layered location of the code block. Further, such a block number may be automatically set by moving the block, and the user is not able to arbitrarily change the block number. That is, the allocation of the block number may be performed at the step S140 of setting the block number for the code block by the code block setting unit depending on the location of the code block, which is set at the step S120 of generating the code block or at the step S130 of setting code block attribute or internal attribute code.

After the block number for the code block has been set, whether to verify the code block is determined at step S150. Here, if it is determined that the verification of the code block is required, that is, when the user desires to verify the code block, the code block is verified at step S160, whereas when the user does not desire to verify the code block, permission for the code block is set at step S170.

At the step S160 of verifying the code block, the function of verifying the code block is performed by the code block verification unit by repeatedly inputting or verifying input or output variables included in the code block using a random variable. Further, the step S160 of verifying the code block may be performed not only by the method using such a random variable, but also by a method for sequentially inputting variables for all values falling within a condition. Further, a description of this verification procedure has been made in detail with reference to FIG. 8, and thus an additional description thereof will be omitted.

Thereafter, permission for the code block is set at step S170. Here, the step S170 of setting permission for the code block is not an essential step, but may be selectively performed depending on the requirements of the user. That is, the step S170 of setting the permission for the code block is configured to set security for each, at least a part, or all of code blocks in the entire code block structure.

Then, whether an operation of generating an additional code block or an operation of editing a certain code block is required is determined at step S180. Here, if it is determined that the operation of generating an additional code block or editing a certain code block is to be performed depending on the selection of the user, the process returns to step S110 of generating a code block, where the above-described steps are repeated. If it is determined that there is no need to perform the operation of generating an additional code block or editing a certain code block depending on the selection of the user, the code block is converted into code corresponding to a preset programming language at step S190.

Thereafter, the code block conversion unit converts the code block into code corresponding to the preset programming language at step S190. Since a description of this conversion procedure has been made in detail with reference to the device for visually implementing software code according to the embodiment of the present invention, an additional description thereof will be omitted.

Below, the step of setting code block information, shown in FIG. 21, will be further described with reference to FIG. 22. FIG. 22 is a flowchart showing the step of setting code block information in response to user input in the method for visually implementing software code according to an embodiment of the present invention. In the following description, a repetitive description of duplicated portions described above will be omitted.

First, whether a new code block has been generated is determined at step S210. That is, by means of step S210 of determining whether a new code block has been generated, it is determined whether the user desires to generate a new code block and perform an operation on the new code block, or desires to edit an existing code block. If it is determined that a new code block has been generated, code block information about the new code block is set at step S230, whereas if it is determined that a new code block is not generated, an existing code block is edited at step S220.

The step S220 of editing the existing code block is configured to perform editing of a code block, for example, the copying, movement, deletion, and editing of the code block, in a layered tree structure or a layered block structure. That is, the step S220 of editing the existing code block denotes a procedure that may be performed without generating a new separate code block at the new code block generation step S120 of FIG. 21, or that may enable editing as desired by the user even if a new code block has been generated. Since the existing code block editing procedure S220 has been described in detail above with reference to FIG. 8, an additional description thereof will be omitted.

The step S230 of setting code block information about the new code block is configured to set code block information about the new code block, generated at the step S120 of generating the new code block. Here, the code block information includes a code block attribute that includes both function information and description information, and internal attribute code in which software code is substantially implemented. That is, when software is implemented using code blocks, the definition of variables used in an upper code block (in a lower code block belonging to the upper block) is required, and the function of lower code blocks is defined using the defined variables as input/output parameters. At the step S230 of setting code block information about the new code block, functions such as function definition or variable setting may be performed. However, the sequence of functions is not always designated, and it is possible to first define blocks only in an approximate manner and then to implement detailed functions, or to first define the usage of data and implement individual functions.

Thereafter, the location and relationship of the code block are set at step S240. The code block disclosed in the present invention is characterized in that it may be represented in a layered tree structure or layered block structure. That is, the step S240 of setting the location and relationship of the code block is configured to set the location of the generated or edited code block and set the relationship of the code block with other code blocks, thus enabling code blocks to be executed without causing errors.

Next, whether the corresponding code block is the lowermost code block is determined at step S250. That is, in code blocks according to the present invention, an upper code block does not contain additional code except for code for the allocation of variables, and actual code is included in the lowermost code block. Due to the characteristics of code blocks, whether the code block is the lowermost code block is determined at step S250. If it is determined that the code block is the lowermost code block, internal attribute code is received from the user at step S260. After the internal attribute code has been received from the user, the block number of the code block starts to be set by the code block setting unit at step S140. If it is determined that the code block is not the lowermost code block, whether to generate a code block is subsequently determined at step S110, thus further determining whether to add another code block. Here, when the function of adding or editing another code block is performed, the steps disclosed in FIG. 21 are performed again, otherwise the process is terminated.

The method for visually implementing software code according to the present invention may be implemented as program instructions that can be executed by various computer means, and may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

The teaching of the principles of the present invention may be implemented as a combination of hardware and software. Further, the software may be implemented as an application program actually implemented in a program storage unit. Such an application program may be uploaded to a machine including any suitable architecture, and may be executed by the machine. Preferably, the machine may be implemented on a computer platform having hardware, such as one or more CPUs, a computer processor, RAM, and Input/Output (I/O) interfaces. Further, the computer platform may include Operating Systems (OSs) and micro-instruction code. Various processes and functions described here may be part of micro-instruction code or part of an application program, or any combination thereof, and these may be executed by various processing devices including CPUs. In addition, various peripheral devices, such as an additional data storage unit and a printer, may be connected to the computer platform.

Since some of the system components and methods illustrated in the attached drawings are preferably implemented as software, it should be additionally understood that actual connections between the system components or between process function blocks may vary depending on the scheme for programming the principles of the present invention. When the teachings are given, those skilled in the art will consider the principles of the present invention, and similar embodiments or configurations.

The invention claimed is:

1. A method for visually implementing software code, the method visually implementing software code used in a programming language when requirements and functions derived to develop software are implemented as code, the method comprising:
   generating, by a code block generation unit, code blocks used to implement software code on a per-block basis depending on the requirements and the functions; and
   setting, by a code block setting unit, a code block attribute or internal attribute code that is included in each of the code blocks, based on information input from a user,
   wherein setting the code block attribute or the internal attribute code comprises:
   including function information about the code block, description information about the function information, and the internal attribute code in the code block,
   including a location, a block number, a management number, an index, and the internal attribute code of the code block in the code block,
   when multiple code blocks are generated by the code block generation unit, classifying the multiple code blocks in a layered tree structure or a layered block structure depending on settings of the user, and
   automatically allocating block numbers depending on locations of the code blocks in the layered tree structure or layered block structure.

2. The method of claim 1, further comprising:
   converting, by a code block conversion unit, the code block into code corresponding to a preset programming language when a request is received from the user.

3. The method of claim 1, further comprising, after setting the code block attribute or the internal attribute code:
   when a request to display the code block is received from the user, displaying function information, description information, and internal attribute code pertaining to the code block on a display unit.

4. The method of claim 1, wherein the block numbers allocated at the allocating of the block numbers are used to determine a sequence of control flow of the code blocks and are automatically allocated depending on setting of the locations of the code blocks, and the code blocks are sequentially coded depending on the block numbers.

5. The method of claim 1, wherein the code blocks are classified into an upper code block and a lower code block depending on locations in a layered tree structure or layered block structure, and are configured such that internal attribute code included in the lower code block is implemented independent of the upper code block, and such that input/output parameters of the lower code block included in the upper code block are capable of being combined and indexed based on characteristics.

6. The method of claim 5, wherein the upper code block includes one or more lower code blocks and internal attribute code for variable declaration of the lower code blocks, and the one or more lower code blocks receive an input parameter from the upper code block and return an output parameter to the upper code block.

7. The method of claim 1, wherein the code blocks include a declarative statement code block, a loop statement code block, and a conditional statement code block depending on control flow.

8. The method of claim 1, wherein setting the code block attribute or the internal attribute code that is included in each of the code blocks comprises setting a relationship between previously generated code blocks and the code blocks to an inclusion relationship or a parallel relationship.

9. The method of claim 1, wherein, at setting the code block attribute or the internal attribute code, the internal attribute code is input from the user via a coding window including at least one of:
   a variable declaration window used to declare an input variable and an output variable of the internal attribute code;
   an input variable allocation window used to allocate the input variable;
   a conditional statement window used to input a conditional statement or a loop statement;
   a code input window used to input software code required to implement a function of the corresponding code block; and
   an output variable allocation window used to allocate the output variable.

10. The method of claim 1, further comprising, after setting the code block attribute or the internal attribute code:
    verifying, by a code block verification unit, the code blocks either using a random variable or using variables that are input to or output from a conditional statement in each code block.

11. The method of claim 1, further comprising, after setting the code block attribute or the internal attribute code:
    setting, by a code block permission setting unit, permission to access the code blocks.

12. A device for visually implementing software code, the device visually implementing software code used in a programming language when requirements and functions derived to develop software are implemented as code, the device comprising:
    a code block generation unit stored in a memory, for generating code blocks used to implement software code on a per-block basis depending on the requirements and the functions; and
    a code block setting unit for setting a code block attribute or internal attribute code that is included in each of the code blocks, based on information input from a user,
    wherein the code block setting unit includes function information about the code block, description information about the function information, and the internal attribute code in the code block, wherein the code block setting unit is configured to, when multiple code blocks are generated by the code block generation unit, classify the multiple code blocks in a layered tree structure or a layered block structure depending on settings of the user, and wherein the code block setting unit automatically allocates block numbers depending on locations of the code blocks in the layered tree structure or layered block structure.

13. The device of claim 12, further comprising a code block conversion unit for converting the code block into code corresponding to a preset programming language when a request is received from the user.

14. The device of claim 12, wherein the code blocks are classified into an upper code block and a lower code block depending on locations in a layered tree structure or layered block structure, and are configured such that internal attribute code included in the lower code block is implemented independent of the upper code block.

15. The device of claim 14, wherein the upper code block includes one or more lower code blocks, and the one or more lower code blocks receive an input parameter from the upper code block and return an output parameter to the upper code block.

* * * * *